(12) United States Patent
Shirotori

(10) Patent No.: US 11,073,676 B2
(45) Date of Patent: Jul. 27, 2021

(54) LENS UNIT AND METHOD FOR MANUFACTURING LENS UNIT

(71) Applicant: NIDEC SANKYO CORPORATION, Suwa-gun Nagano (JP)

(72) Inventor: Toshio Shirotori, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 184 days.

(21) Appl. No.: 16/020,284

(22) Filed: Jun. 27, 2018

(65) Prior Publication Data

US 2018/0372984 A1    Dec. 27, 2018

(30) Foreign Application Priority Data

Jun. 27, 2017 (JP) .............................. JP2017-125083

(51) Int. Cl.
*G02B 7/02* (2021.01)
*G02B 13/00* (2006.01)

(52) U.S. Cl.
CPC ............. *G02B 7/025* (2013.01); *G02B 7/021* (2013.01); *G02B 7/026* (2013.01); *G02B 13/0045* (2013.01)

(58) Field of Classification Search
CPC .......... G02B 7/02; G02B 7/021; G02B 7/022; G02B 7/025; G02B 7/026; G02B 7/023; G02B 7/003; G02B 7/04; G02B 7/08; G02B 13/001; G02B 23/2476; G02B 27/62; G02B 3/00; G02B 13/0045; G02B 3/0075; G02B 5/003; G02B 5/005; G02B 13/0035; G02B 13/004; G02B 13/0085; G03B 17/12; G03B 17/14; G03B 3/10; G03B 17/02; G03B 21/142; G03B 21/145; G03B 21/28; G03B 11/045; G03B 13/36; G03B 17/08; G03B 17/17; G03B 17/55; G03B 19/023; G03B 21/005; G03B 21/10; G03B 21/2013; G03B 21/2033; G03B 21/2066; G03B 21/208; G03B 2205/00
See application file for complete search history.

(56) References Cited

U.S. PATENT DOCUMENTS

| | | | | |
|---|---|---|---|---|
| 2010/0001071 | A1* | 1/2010 | Ohara | G02B 7/021 235/454 |
| 2014/0118852 | A1* | 5/2014 | Komiyama | G02B 9/34 359/771 |
| 2018/0188473 | A1* | 7/2018 | Kanzaki | G02B 9/62 |
| 2019/0278046 | A1* | 9/2019 | Yamamoto | G02B 9/64 |
| 2019/0310438 | A1* | 10/2019 | Komiyama | G02B 13/18 |

FOREIGN PATENT DOCUMENTS

JP    2014170123 A    9/2014

\* cited by examiner

*Primary Examiner* — William R Alexander
*Assistant Examiner* — Sharrief I Broome
(74) *Attorney, Agent, or Firm* — Cantor Colburn LLP

(57) ABSTRACT

A lens unit may include a plurality of lenses, and a mirror cylinder that holds the plurality of lenses. At least one of the plurality of lenses may include a glass lens held in a lens holder having a cylinder part. The lens holder may include an annular projection part that protrudes radially inward from the cylinder part, on the opposite side of the cylinder part from an installation opening for the glass lens. The glass lens may be press-fitted and fixed in the cylinder part with a gap between the glass lens and the annular projection part.

8 Claims, 10 Drawing Sheets

FIG. 2A
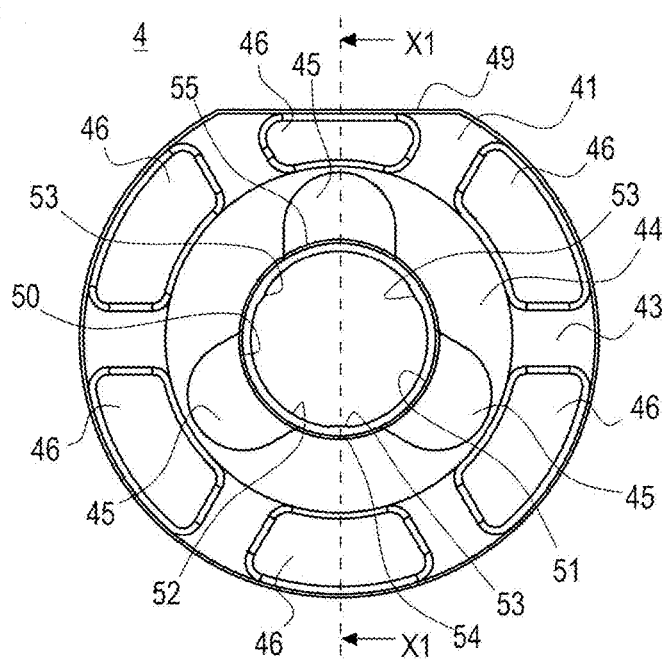
FIG. 2C
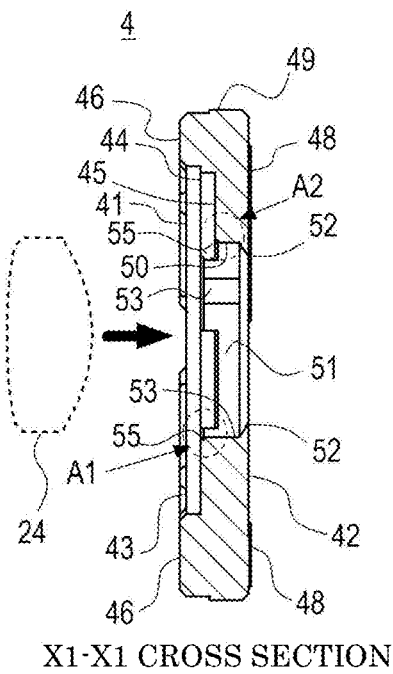
X1-X1 CROSS SECTION
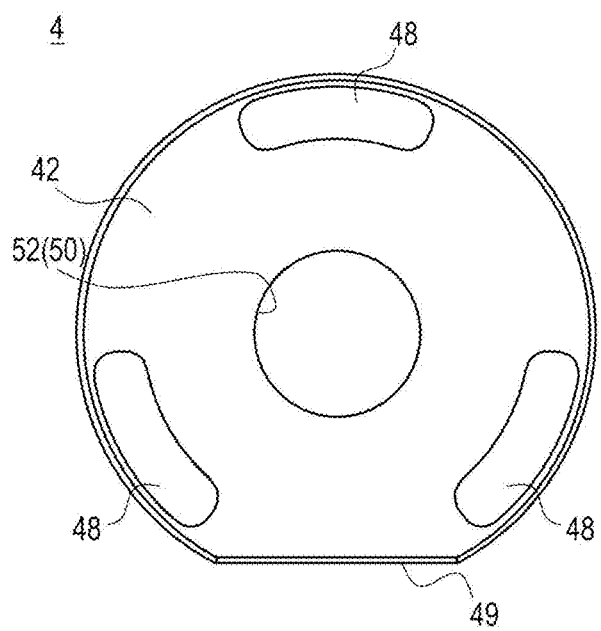
FIG. 2B

X2-X2 CROSS SECTION

FIG. 7A
MOLDING PROCESS
FIG. 7B
MOLD OPENING PROCESS
FIG. 7C
MOLDED ARTICLE SEPARATION PROCESS
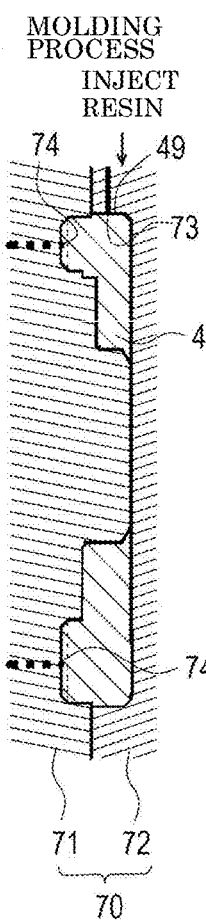
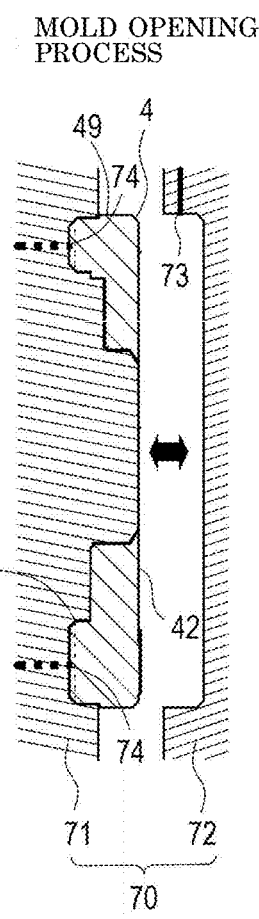
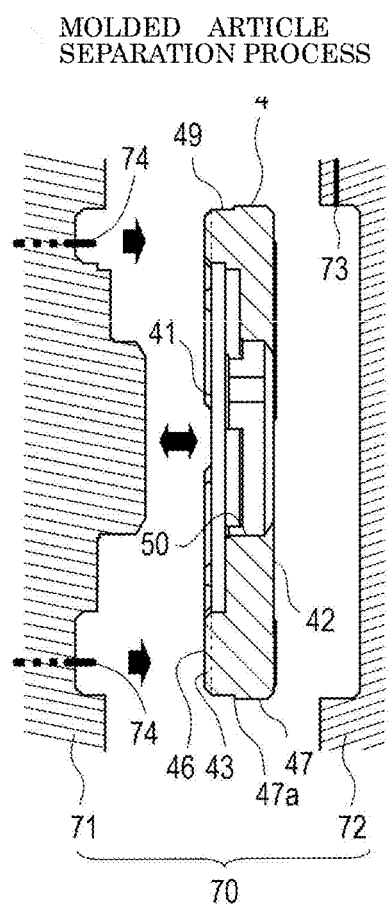

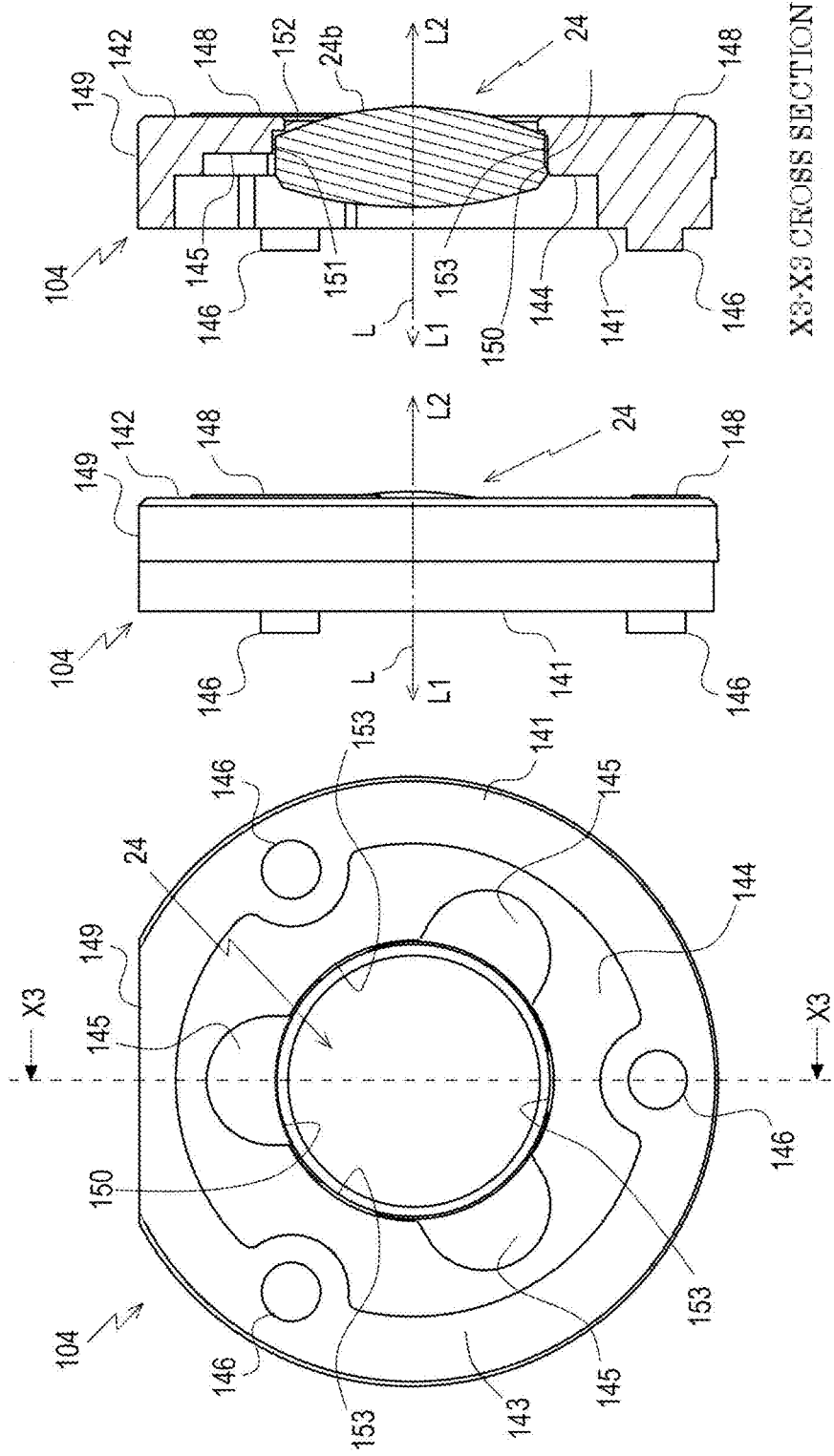

LENS UNIT AND METHOD FOR MANUFACTURING LENS UNIT

CROSS REFERENCE TO RELATED APPLICATION

The present invention claims priority under 35 U.S.C. § 119 to Japanese Application No. 2017-125083 filed Jun. 27, 2017, the entire content of which is incorporated herein by reference.

BACKGROUND

Field of the Invention

At least an embodiment of the present invention relates to a lens unit and a method for manufacturing a lens unit. For example, at least an embodiment of the present invention relates to a lens unit that includes a plurality of lenses and a mirror cylinder that holds the plurality of lenses, as well as to a method for manufacturing such a lens unit.

Description of the Related Documents

In a lens unit in which a plurality of lenses are arranged and held in a mirror cylinder, a lens holder made of resin or metal is sometimes used to assemble a glass lens (refer to JP 2014-170123A, for example). That is, the glass lens is arranged inside the mirror cylinder in a state fitted into a lens holder.

Typically, the positioning in the height direction of the glass lens and the lens holder is performed by bringing the glass lens into contact with the lens holder, but there are several problems with this approach: (1) It requires part accuracy of the lens holder, (2) the relative position between the lens holder and the glass lens varies due to the part tolerance of the glass lens and the lens holder, and (3) when the lens is assembled, the lens receiving surface of the lens holder deforms so the height varies. In particular, in recent years, the requirements with respect to optical characteristics of the overall lens unit have become more stringent, an improvement in accuracy of each of the lenses is required, and there is a demand for greater assembly accuracy of the glass lens and the lens holder.

In view of the situation described above, at least an embodiment of the present invention provides technology for improving the optical characteristics of a lens unit in which a plurality of lenses are arranged and held in a mirror cylinder.

SUMMARY

At least an embodiment of the present invention is a lens unit provided with a plurality of lenses, and a mirror cylinder that holds the plurality of lenses, in which at least one of the plurality of lenses includes a glass lens held in a lens holder having a cylinder part, the lens holder has an annular projection part that protrudes radially inward from the cylinder part, on the opposite side of the cylinder part from an installation opening for the glass lens, and the glass lens is press-fitted and fixed in the cylinder part with a gap between the glass lens and the annular projection part.

Because the glass lens is press-fitted and fixed to the cylinder part with a gap between the glass lens and the annular projection part, the position of the glass lens in the optical axis direction can be accurately obtained regardless of the part accuracy of the lens holder, the part tolerance of the glass lens and the lens holder, and deformation of the lens holder at the time of assembly and the like.

Also, because the glass lens is press-fitted and fixed in the cylinder part, there is a concern that shavings may be produced by a portion of the cylinder part scraping off at the time of press-fitting. There is a concern that these shavings may end up leading to a decrease in the positional accuracy of the glass lens in the optical axis direction. However, the shavings are able to be accommodated in the gap between the glass lens and the annular projection part, so this concern can be eliminated.

Also, the glass lens may be fixed with an adhesive. As described above, the glass lens is press-fitted and fixed in the cylinder part with a gap between the glass lens and the annular projection part. In order to avoid deformation and the like that accompanies press-fitting, the press-fitting force may be set small, and in such a case, the fixation can be reinforced by fixing the gap with an adhesive.

Further, a stepped part for burr clearance may be formed at the installation opening. Burrs may be produced at the installation opening when the lens holder is removed from a mold at the time of resin molding. These burrs may be dragged in at the time of press-fitting, so providing the stepped part makes it possible to keep the burrs away from the press-fit portion of the lens, and thus makes it possible to inhibit the burrs from getting dragged in.

Also, the annular projection part may have a shape that follows an opposing portion of a lens surface on the opposite side of the glass lens from the installation opening. That is, by setting the gap between the annular projection part and the lens surface on the opposite side from the installation opening narrow, capillary action makes it possible to prevent adhesive from spreading to the effective surface of the lens surface on the side opposite the installation opening when the adhesive is injected.

Also, the cylinder part may include a bulging part that bulges out radially inward and is used to press-fit and fix the glass lens. By forming the bulging part in a plurality of, more specifically three, locations at equidistant intervals so as to extend in the axial direction, on the inner peripheral surface of the cylinder part, the load in press-fitting is able to be balanced.

Further, the lens holder may include a D-cut part, and the bulging part may be formed avoiding a region corresponding to the D-cut part. If the bulging part were formed on a portion corresponding to the D-cut part, the D-cut part may deform due to the load at the time of press-fitting, so the degree of freedom in design would end up decreasing. This is able to be avoided.

Also, a projection part that serves as a position reference surface when arranged on an adjacent lens may be provided on an image-side surface of the lens holder, and the bulging part may be formed in the same radial direction as the position where the projection part is formed. Forming the bulging part and the projection part in the same radial direction is advantageous from the viewpoint of strength because the projection part is in the direction in which force is applied (the image side) when press-fitting the glass lens.

Also, an adhesive groove, which is a groove that is connected to the installation opening and into which the adhesive is injected and accumulates, may be provided on an installation opening-side flat surface of the lens holder. A predetermined amount of the adhesive is injected into the adhesive groove from a supply needle. The injected adhesive reliably flows from the installation opening into the gap between the glass lens and the cylinder part, and thus will not spread in an unintended direction.

Also, the glass lens may be fixed inside the cylinder part by the adhesive that has flowed into a gap between the lens side surface of the glass lens and the cylinder part side surface of the cylinder part and cured, and the adhesive that has flowed into the gap between the glass lens and the annular projection part and cured.

Also, the glass lens may have an inclined surface formed on the installation opening side of the glass lens, the adhesive may be injected onto the installation opening-side flat surface of the lens holder, and the glass lens may be fixed inside the cylinder part by the adhesive that has flowed into the gap between the inclined surface and the cylinder part side surface and cured.

At least an embodiment of the present invention is a method for manufacturing the lens unit described above, which includes, in a process for press-fitting and fixing the glass lens in the cylinder part of the lens holder, a jig arranging process for arranging a spacer having an opening, on a jig surface that is made of material harder than the glass lens and that has been mirror finished, a lens holder arranging process for arranging the lens holder on the spacer such that the image-side opening of the cylinder part is aligned with the opening of the spacer, and a lens press-fitting process for press-fitting the glass lens until the image-side lens surface abuts against the jig surface.

The press-fitting amount of the glass lens can be adjusted by spacers of different thicknesses. That is, the optical characteristics can be changed. Also, the mirror-finished jig surface is used as the glass receiving surface, so the glass lens will not be scratched. Also, because the material is harder than the glass lens, the jig surface can be prevented from deforming, so variation in the press-fitting amount can be prevented.

According to at least an embodiment of the present invention, it is possible to improve the optical characteristics of a lens unit in which a plurality of lenses are arranged and held in a mirror cylinder.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2A to FIG. 2C are views illustrating a lens holder in a state in which a fourth lens has been removed according to the first embodiment;

FIG. 7A to FIG. 7C are views illustrating a manufacturing process of the lens holder according to the first embodiment;

FIG. 9A to FIG. 9C are views of a lens holder in a state in which the fourth lens has been press-fitted and fixed according to a second embodiment.

DETAILED DESCRIPTION

Hereinafter, at least an embodiment of the present invention will be described in detail with reference to the drawings.

First Embodiment

Figure 1A:
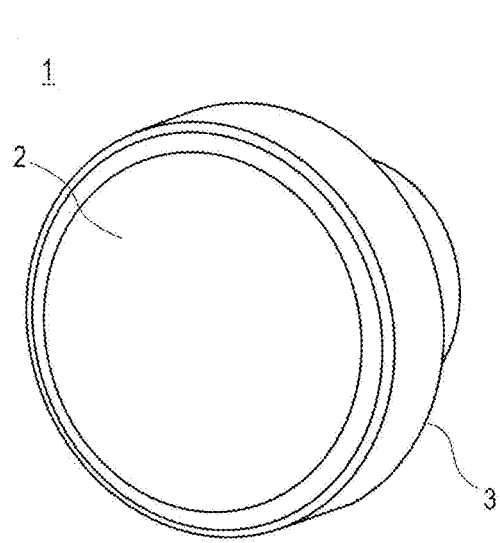
FIG. 1A to FIG. 1C are views illustrating an overall lens unit according to a first embodiment.
Figure 1B:
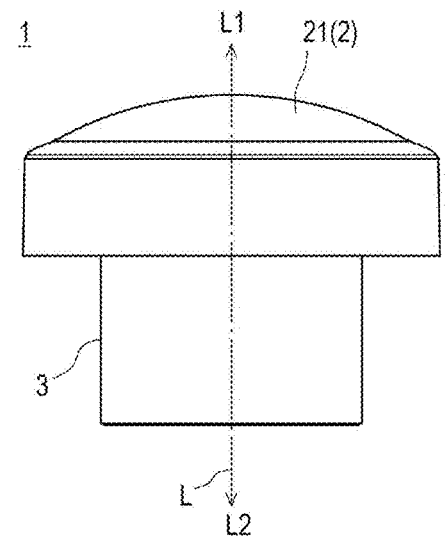
Figure 1C:
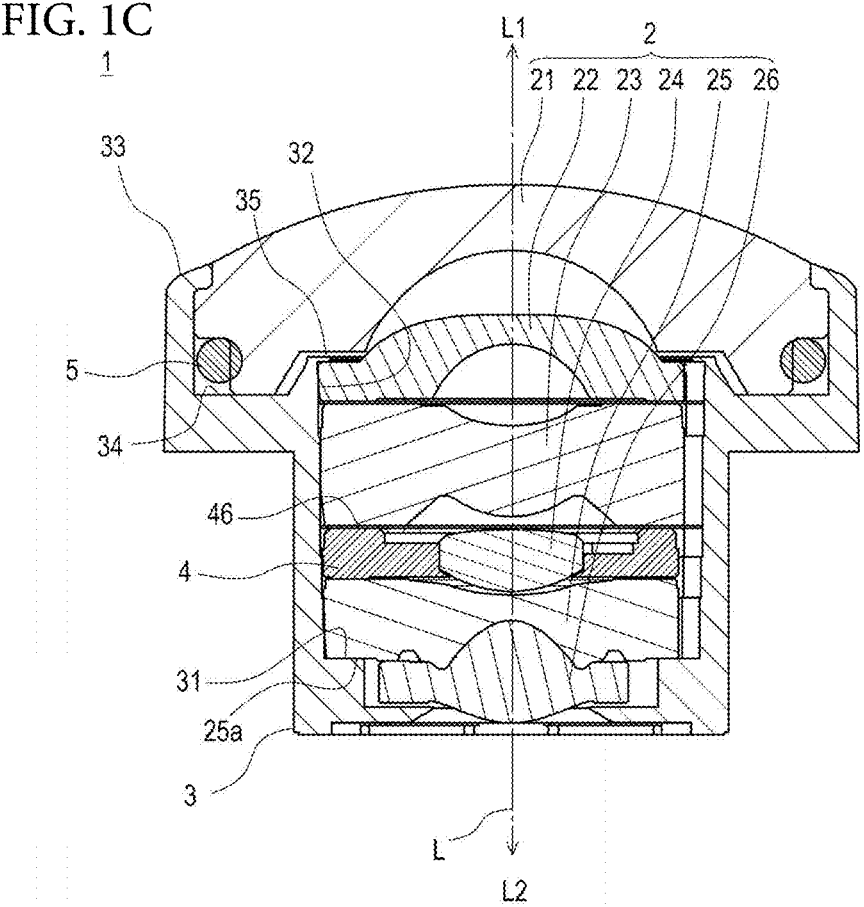

FIG. 1A to FIG. 1C are views illustrating an overall lens unit 1 according to the present embodiment, with FIG. 1A being a perspective view, FIG. 1B being a front view, and FIG. 1C being a longitudinal sectional view.

The lens unit 1 is a lens assembly to be incorporated into an on-board peripheral monitoring camera, a monitoring camera, or a doorphone or the like. Note that "object side L1" and "image side L2" of at least an embodiment of the present invention refer to the object side and the image side, respectively, in an optical axis L direction, and "optical axis direction" refers to a direction parallel to the optical axis L.

(Overall Configuration)

The lens unit 1 includes a wide-angle lens 2 formed from a plurality of lenses, and a mirror cylinder 3 that houses the wide-angle lens 2. The wide-angle lens 2 includes six lenses: a first lens 21, a second lens 22, a third lens 23, a fourth lens 24, a fifth lens 25, and a sixth lens 26 that are closely arranged along the optical axis L from the object side L1 toward the image side L2.

Of the lenses that make up the wide-angle lens 2, the first lens 21 is arranged closest to the object side L1. The second lens 22 is positioned to the image side L2 of the first lens 21. The third lens 23 is positioned to the image side L2 of the second lens 22. The fourth lens 24 is positioned to the image side L2 of the third lens 23. The fourth lens 24 is arranged in the mirror cylinder 3 in a state press-fitted and fixed in a lens holder 4 made of resin, and is further reinforcibly fixed with an adhesive. Next, the specific configuration of the lens holder 4 will be described. The fifth lens 25 is positioned to the image side L2 of the fourth lens 24. The sixth lens 26 is positioned to the image side L2 of the fifth lens 25. The fifth lens 25 and the sixth lens 26 form a cemented lens.

A glass lens is used for the first lens 21 from the viewpoint that even if the object-side lens surface of the first lens 21 that is positioned closest to the object side is exposed, the object-side lens surface of the first lens 21 will not easily become scratched. Plastic lenses are used for the second lens 22, the third lens 23, the fifth lens 25, and the sixth lens 26 in view of the excellent workability and economic efficiency of the lenses. A glass lens is used for the fourth lens 24 from the viewpoint of excellent optical characteristics such as the refractive index with respect to changes in temperature, and lens surface accuracy and the like.

Note that the wide-angle lens 2 of the lens unit 1 in the present embodiment is formed by the six lenses described above, but the number of lenses is not limited, and nor is the material of the lenses limited. Also, a configuration in which a cemented lens is not provided is also possible.

The mirror cylinder 3 is a cylindrical lens frame made of resin, and the inner peripheral surface is formed toward the image side while following the outer peripheral surface of the lenses that form the wide-angle lens 2. The first lens 21, the second lens 22, the third lens 23, the lens holder 4 (the fourth lens 24), the fifth lens 25, and the sixth lens 26 that form the wide-angle lens 2 are positioned in the optical axis L direction by the outer peripheral surfaces thereof being supported by the inner peripheral surface of the mirror cylinder 3.

Also, a flat part 25a formed on a peripheral edge of the surface on the image side of the fifth lens 25 is placed on an annular flat part 31 that extends radially inward on the image side of the mirror cylinder 3. Also, a peripheral edge of the surface on the object side L1 of the second lens 22 is retained by a crimped part 35 provided on an end part of the object-side inner peripheral surface of the mirror cylinder 3.

As a result, the second lens 22, the third lens 23, the lens holder 4 (the fourth lens 24), the fifth lens 25, and the sixth lens 26 are positioned in the optical axis L direction. Moreover, an O-ring 5 is fitted onto an outer peripheral portion of the first lens 21, and then the first lens 21 onto which the O-ring 5 has been fitted is fitted into an annular groove part 34. Then, the peripheral edge of the first lens 21 is retained by a crimped part 33 provided on an object-side end part of the mirror cylinder 3. It is by this process that the first lens 21 is positioned in the optical axis L direction.

Here, from the viewpoint of preventing the second lens 22, the third lens 23, the lens holder 4 (the fourth lens 24), the fifth lens 25, and the sixth lens 26 from being inserted in the wrong order, the lenses have increasingly smaller outer diameters the closer the lenses are to the image side L2, and an inner peripheral surface 32 is formed correspondingly narrower. Also, a D-cut part is formed on the right-side region in FIG. 1C of the second lens 22, the third lens 23, the lens holder 4 (the fourth lens 24), the fifth lens 25, and the sixth lens 26.

(Lens Holder Configuration)

Figure 3A:
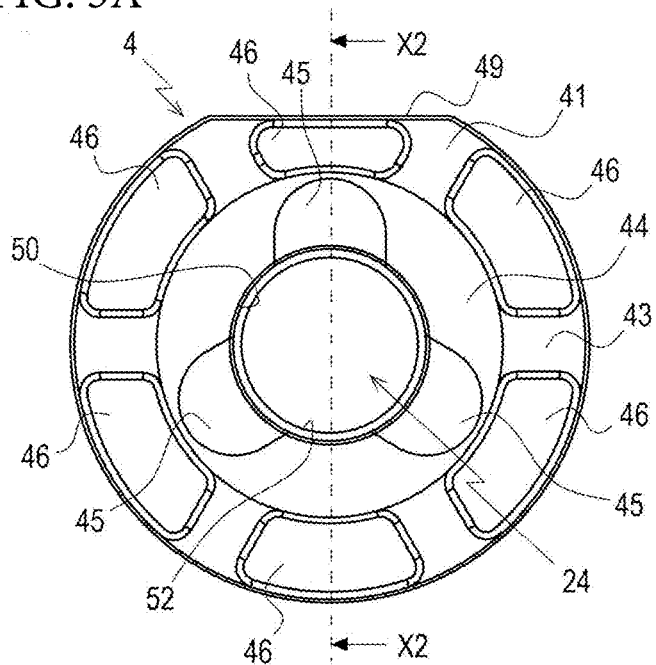
FIG. 3A to FIG. 3C are views illustrating the lens holder in a state in which the fourth lens has been press-fitted and fixed according to the first embodiment.
Figure 3C:
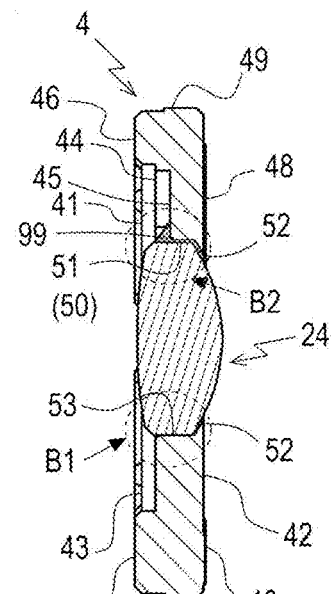
Figure 3B:
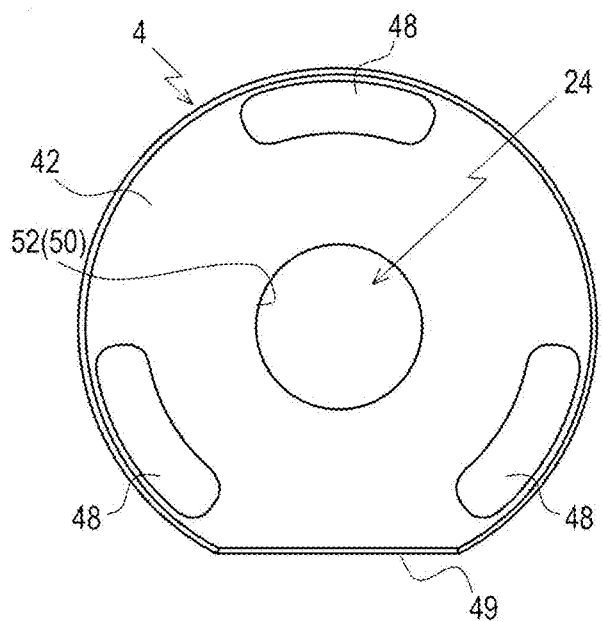
Figure 4A:
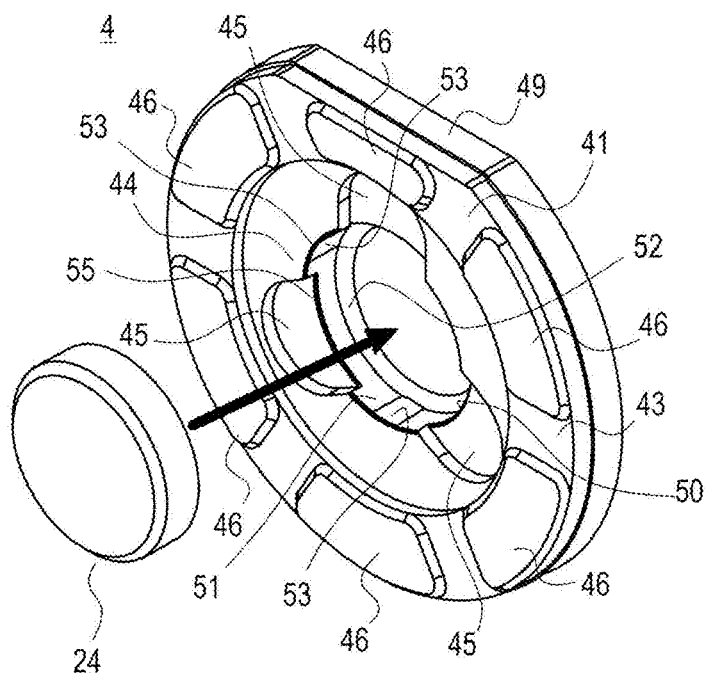
FIG. 4A and FIG. 4B are perspective views of the lens holder according to a first embodiment.
Figure 4B:
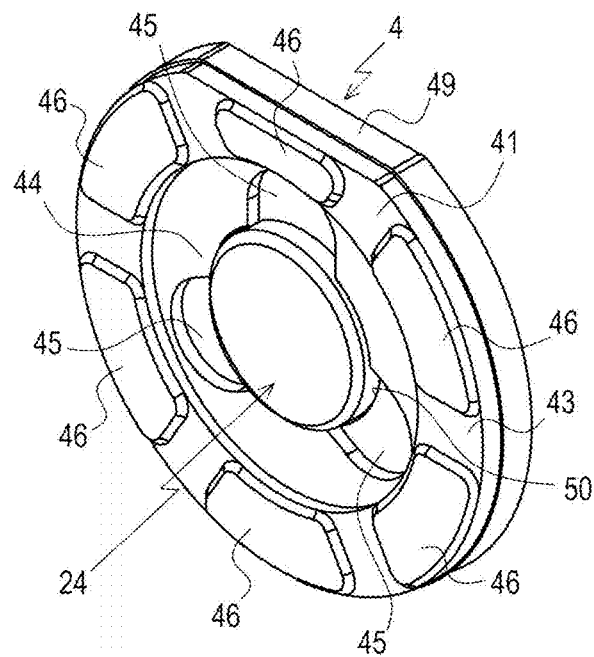
Figure 5A:
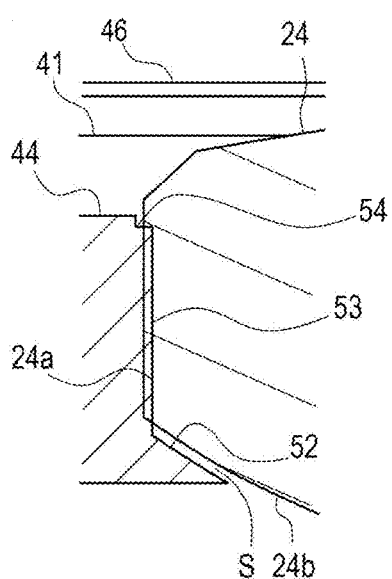
FIG. 5A and FIG. 5B are enlarged views of a press-fitting portion of the fourth lens and a cylinder part of the lens holder according to the first embodiment.
Figure 5B:
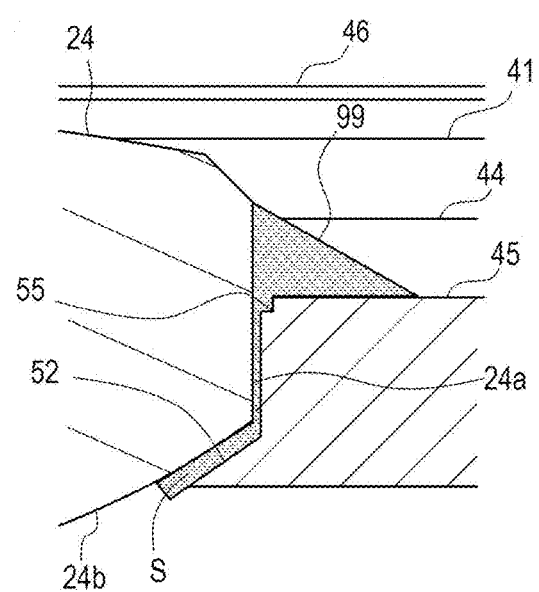
Figure 6A:
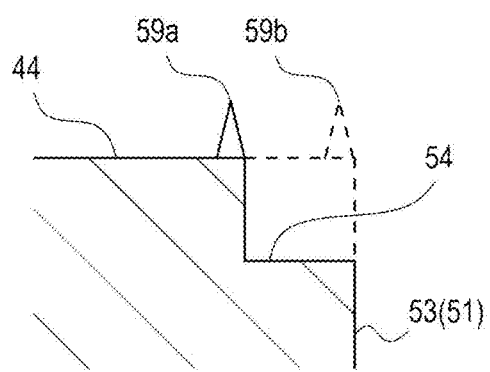
FIG. 6A and FIG. 6B are enlarged views of a boundary portion of the cylinder part according to the first embodiment.
Figure 6B:
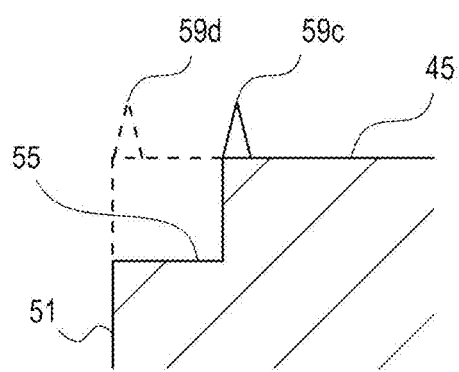

Next, the configuration of the lens holder 4 and the fixation configuration of the lens holder 4 and the fourth lens 24 will be described with reference to FIG. 2A to FIG. 4B. FIG. 2A to FIG. 2C are views illustrating the lens holder 4 in a state in which the fourth lens 24 has been removed. FIG. 2A is a plan view, FIG. 2B is a rear view, and FIG. 2C is a sectional view taken along line X1-X1 in FIG. 2A. FIG. 3A to FIG. 3C are views illustrating the lens holder 4 in a state in which the fourth lens 24 has been press-fitted and fixed. FIG. 3A is a plan view, FIG. 3B is a rear view, and FIG. 3C is a sectional view taken along line X2-X2 in FIG. 3A. FIG. 4A and FIG. 4B are perspective views of the lens holder 4, with FIG. 4A being a view of the lens holder 4 before the fourth lens 24 is fixed, and FIG. 4B being a view of the lens holder 4 after the fourth lens 24 is fixed. FIG. 5A and FIG. 5B a reenlarged vies of the press-fitting portion of the fourth lens 24 and a cylinder part 50 of the lens holder 4, with FIG. 5A being an enlarged view of region B1 in FIG. 3C, and FIG. 5B being an enlarged view of region B2 in FIG. 3C. FIG. 6A and FIG. 6B are enlarged views of a boundary portion of the cylinder part 50, with FIG. 6A being a view of a stepped part 54 in region A1 in FIG. 2C, and FIG. 6B being a view of a stepped part 55 in region A2 in FIG. 2C. FIG. 7A to FIG. 7C is a view illustrating the manufacturing process of the lens holder 4, with FIG. 7A being a view of a molding process, FIG. 7B being a view of a mold opening process, and FIG. 7C being a molded article separation process.

The lens holder 4 is made of resin and formed in a substantially cylindrical shape. The outer peripheral portion of the lens holder has a D-cut part 49 where a section of the outer peripheral portion of the lens holder 4 has been cut out. A gate opening of a mold is positioned at the D-cut part 49 at the time of resin molding.

The cylinder part 50 is provided in the center of the lens holder 4. This cylinder part 50 passes through from an object-side flat surface 41 that is an installation opening-side flat surface to an image-side flat surface 42 (i.e., in the optical axis L direction) that is a surface on the opposite side from the installation opening-side flat surface. The fourth lens 24 is installed and fixed to this cylinder part 50 by press-fitting. The opening on the object side L1 is the installation opening for the fourth lens 24. Note that the press-fitting of the fourth lens 24 may be achieved with relatively little force due to the need to avoid deformation and the like at the time of press-fitting. Also, an adhesive 99 is used to additionally reinforce the fixation.

A press-fitting part 53 that extends in the optical axis L direction is formed in three locations at equidistant intervals along the circumferential direction of the lens holder 4, on a cylinder part side surface 51 that is the inner peripheral surface of the cylinder part 50. The press-fitting part 53 is a bulging part formed in a shape bulging out toward the radial inside (i.e., toward the center) of the cylinder part 50, for example. Here, the bulging tip end portion is a flat surface.

When the fourth lens 24 is installed in the cylinder part 50, a lens side surface 24a is held by the press-fitting part 53, as illustrated in FIG. 5A. That is, the fourth lens 24 is press-fitted and fixed by the press-fitting part 53. Note that the press-fitting part 53 is not limited to three locations, and may be formed at equidistant intervals at more than three locations. Further, the press-fitting part 53 is not limited to the shape described above, and may have a rib shape or a semi-spherical projection shape. Also, the press-fitting part 53 is formed avoiding the angular direction in which the D-cut part 49 and an adhesive groove 45 that will be described later are formed, taking into account the load at the time of press-fitting and the strength in the direction of the D-cut part 49.

Because the fourth lens 24 that is installed in the cylinder part 50 is supported and fixed at three locations, it is possible to prevent problems such as breaking or cracking of the lens holder 4 or the fourth lens 24 due to resin shrinkage of the lens holder 4 that occurs when the temperature decreases, which can be expected when the fourth lens 24 is fixed along the entire peripheral surface.

An annular projection part 52 that protrudes a predetermined length radially inward is formed on the outer edge of the end portion on the image side L2 of the cylinder part 50, i.e., at the opening portion of the image-side flat surface 42. The annular projection part 52 covers the outer edge portion of an image-side lens surface 24b, i.e., the lens surface on the opposite side from the installation opening.

However, as illustrated in FIG. 5A and FIG. 5B, the annular projection part 52 is formed opposing at an angle, and slightly separated from, the image-side lens surface 24b, instead of directly contacting the image-side lens surface 24b. That is, the image-side lens surface 24b of the fourth lens 24 is press-fitted and fixed to the cylinder part 50 with a gap S between the image-side lens surface 24b and the annular projection part 52. Also, the annular projection part 52 has a shape that follows the opposing portion of the image-side lens surface 24b of the fourth lens 24. This annular projection part 52 makes it possible to prevent the gap between the cylinder part side surface 51 and the lens side surface 24a from being directly exposed to the image side L2. Also, because the annular projection part 52 is separated from the image-side lens surface 24b, it is easier to make adjustments for any tilt error of the fourth lens 24 after press-fitting the fourth lens 24.

Further, as described above, the press-fitting parts 53 are formed at predetermined intervals on the cylinder part 50 in order to press-fit and fix the fourth lens 24. Therefore, there are regions where a slight gap is formed between the lens side surface 24a of the fourth lens 24 and the cylinder part 50. Although adhesive 99 that will be described later is injected into this portion, not all of the gap is always filled, and as a result, light may enter the gap, which may lead to ghosting. However, because the annular projection part 52 is formed, light that enters from the gap is able to be blocked. As a result, ghosting is able to be suppressed.

The object-side flat surface 41 is formed by an annular outer edge-side flat surface 43 on the outer peripheral side, and an annular inner edge-side flat surface 44 on the inner peripheral side that is formed slightly lower than the outer edge-side flat surface 43. The boundary on the inner peripheral side of the inner edge-side flat surface 44 is the boundary between the inner edge-side flat surface 44 and the cylinder part 50. A stepped part 54 for burr clearance is formed, as illustrated in FIG. 6A, at this boundary.

Here, the manufacturing process of the lens holder 4 will be briefly described with reference to FIG. 7A to FIG. 7C. The lens holder 4 is manufactured by resin molding using a mold 70 having a movable die 71 and a fixed die 72. As illustrated in the molding process in FIG. 7A, resin is injected into the mold 70 through a gate 73 while the movable die 71 and the fixed die 72 are in a closed state. The object-side flat surface 41 is arranged corresponding to the movable die 71, and the image-side flat surface 42 is arranged corresponding to the fixed die 72. Also, the boundary between the movable die 71 and the fixed die 72 is a holder-side surface 47 (substantially near the center) of the lens holder 4. A parting line 47a of the lens holder 4 is formed, as illustrated in the molded article separation process in FIG. 7C, by this boundary. Also, the gate 73 (gate opening) is positioned at the portion of the D-cut part 49.

As in the mold opening process in FIG. 7B, the movable die 71 and the fixed die 72 are separated when the resin has cured. At this time, the lens holder 4 is in a state separated from the fixed die 72, and fixed to the movable die 71. Then, as illustrated in the molded article separation process in FIG. 7C, ejector pins 74 provided in the movable die 71 push on the outer edge-side flat surface 43 of the object-side flat surface 41, such that the lens holder 4 separates from the movable die 71.

When removing the mold 70 during resin molding of the lens holder 4, the mold 70 relatively moves in the direction opposite the insertion direction of the fourth lens 24, i.e., upward in FIG. 6A. In FIG. 7C, the movable die 71 relatively moves in the direction away from the lens holder 4. At this time, a burr 59a forms at the boundary between the inner edge-side flat surface 44 and the stepped part 54, i.e., at a position away from the cylinder part side surface 51, as illustrated in FIG. 6A, for example. If there were no stepped part 54, a burr 59b may form at the portion indicated by the broken line. The burr 59b at this portion may be dragged inside the cylinder part 50 during press-fitting of the fourth lens 24, and as a result, the fourth lens 24 may become offset in the press-fitting direction or the like, which may adversely affect the optical characteristics. In particular, in recent years, the requirements with respect to the optical characteristics of the overall lens unit 1 have become more stringent, so it is necessary to avoid such burrs 59b.

A boss-shaped object-side positioning part 46 that protrudes toward the object side L1 is formed in six locations at equidistant intervals along the circumferential direction of the lens holder 4, on the outer edge-side flat surface 43. The third lens 23 is placed on these object-side positioning parts 46. That is, the object-side positioning parts 46 function as reference surfaces for the third lens 23. Also, for example, the flat surface (the outer edge-side flat surface 43) between the object-side positioning parts 46 can also be used as an ejector pin abutting surface for removing the lens holder 4 from the mold 70, when forming the lens holder 4 with the mold. Note that the ejector pin abutting surface is not limited to being between the object-side positioning parts 46, and may be provided on the inner edge-side flat surface 44, or provided inside the adhesive groove 45, for example. Also, an ejector pin abutting surface may be provided on the object-side positioning part 46, in a position slightly lower than the end surface of the object-side positioning part 46.

Note that the positions where the object-side positioning parts 46 are formed are at 60-degree intervals with the position where the D-cut part 49 is formed (i.e., the 12 o'clock position) as a reference, as illustrated in FIG. 2A. The object-side positioning part 46 has a generally trapezoidal shape as shown in the drawing, and, except for the object-side positioning part 46 that is formed in the region where the D-cut part 49 is formed, the other five object-side positioning parts 46 have the same shape. Note that the object-side positioning part 46 is not limited to six locations, and may be formed at equidistant intervals at three or more locations.

The adhesive groove 45 is formed at three locations that are at equidistant intervals along the circumferential direction of the lens holder 4, on the inner edge-side flat surface 44. That is, the adhesive groove 45 is a groove within which adhesive provided on the object-side surface (the inner edge-side flat surface 44) of the lens holder 4 accumulates when the adhesive is injected. The positions where the adhesive grooves 45 are formed are at 120-degree intervals with the position where the D-cut part 49 is formed (i.e., the 12 o'clock position) as a reference, as illustrated in FIG. 2A.

The adhesive groove 45 is a generally semicircular groove of a predetermined depth, and is connected to the cylinder part 50 which is the installation opening for the fourth lens 24. A stepped part 55 for burr clearance is formed at the boundary portion of the cylinder part 50 and the adhesive groove 45, for the same reason the stepped part 54 is formed at the boundary portion of the inner edge-side flat surface 44. As illustrated in FIG. 6B, if there were no stepped part 55, a burr 59d may form at the portion indicated by the broken line when removing the mold at the time of resin molding the lens holder 4. To avoid this, burr formation is controlled such that a burr 59c will form at a position away from the cylinder part side surface 51.

The adhesive 99 is injected into this adhesive groove 45 after the fourth lens 24 is press-fitted and fixed in the cylinder part 50. As illustrated in FIG. 5B, the adhesive 99 that has been injected into the adhesive groove 45 flows into the gap between the fourth lens 24 and the cylinder part 50 due to the fluidity of the adhesive 99. That is, the fourth lens 24 that is a glass lens is fixed inside the cylinder part 50 by the adhesive 99 that has flowed into the gap between the lens side surface 24a of the fourth lens 24 and the cylinder part side surface 51 of the cylinder part 50 and cured, and the adhesive 99 that has flowed into a gap S between the fourth lens 24 and the annular projection part 52 and cured.

Note that the adhesive 99 is an ultraviolet cure adhesive, for example, that is cured by ultraviolet light irradiation when an appropriate amount of the adhesive 99 has flowed into the gap after being injected into the adhesive groove 45.

At this time, the annular projection part 52 and the capillary action of the gap prevent the adhesive 99 from crossing the annular projection part 52 and spreading to the image-side lens surface 24b. Also, because the gap is filled with the adhesive 99, shavings and the like that were produced by press-fitting the fourth lens 24 are fixed, so adverse effects such as a decrease in the optical characteristics are able to be eliminated.

Figure 10A:
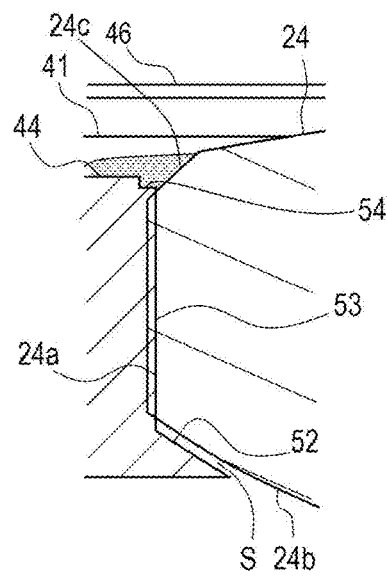
FIG. 10A to FIG. 10B are enlarged views of a press-fitting portion of the cylinder part of the lens holder and the fourth lens according to a modified example of the first embodiment.
Figure 10B:
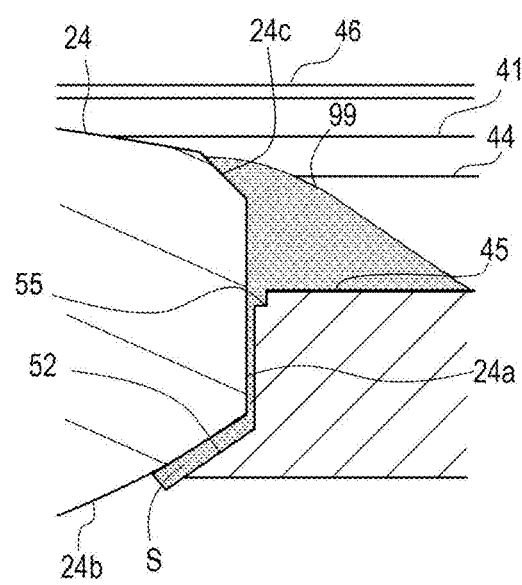

Further, as illustrated in FIG. 10A and FIG. 10B, for example, the fourth lens 24 that is a glass lens may have an inclined surface 24c formed on the object side (the installation opening side) of the fourth lens 24, the inner edge-side flat surface 44 that is the object-side flat surface 41 which is the installation opening-side flat surface of the lens holder 4 may have a shape that is thicker on the object side than the lens holder 4 illustrated in FIG. 5A and FIG. 5B, the adhesive 99 may be injected onto the inner edge-side flat surface 44, and the fourth lens 24 may be fixed inside the cylinder part 50 by the adhesive 99 that has flowed into gap between the inclined surface 24c and the cylinder part side surface 51 and cured. In this case, the fourth lens 24 that is a glass lens is fixed inside the cylinder part 50 of the lens holder 4 by adhesive on both the object side L1 and the image side L2 in the optical axis direction, so the fixing strength of the glass lens in the optical axis direction can be further increased. Therefore, offset of the fourth lens 24 in the optical axis direction due to an external impact can be suppressed.

Note that the adhesive grooves 45 and the press-fitting parts 53 are arranged in different positions (angular directions) in the circumferential direction of the lens holder 4. That is, the adhesive grooves 45 are formed in angular directions that are offset 60 degrees in this case so as to be in directions between adjacent press-fitting parts 53. Therefore, the adhesive grooves 45 are formed at portions where the gap between the fourth lens 24 and the cylinder part side surface 51 of the cylinder part 50 is formed, so the adhesive 99 is able to better flow into this gap.

A boss-shaped image-side positioning part 48 that protrudes at a predetermined height toward the image side L2 is formed in three locations at equidistant intervals along the circumferential direction of the lens holder 4. That is, the image-side positioning parts 48 is a projection part that serves as a position reference surface when arranged on an adjacent lens (the fifth lens 25). Note that the image-side positioning part 48 is not limited to three locations, and need only be formed at equidistant intervals along the circumferential direction of the lens holder 4. Only the flatness of the image-side positioning part 48 needs to be highly accurate. The flatness of the overall image-side flat surface 42 does not need to be highly accurate.

(Press-Fitting Process of the Fourth Lens 24 into the Lens Holder 4)

The process for press-fitting the fourth lens 24 into the lens holder 4 will be described with reference to the sectional process drawing of the press-fitting process illustrated in FIG. 8A to FIG. 8D.

Figure 8A:
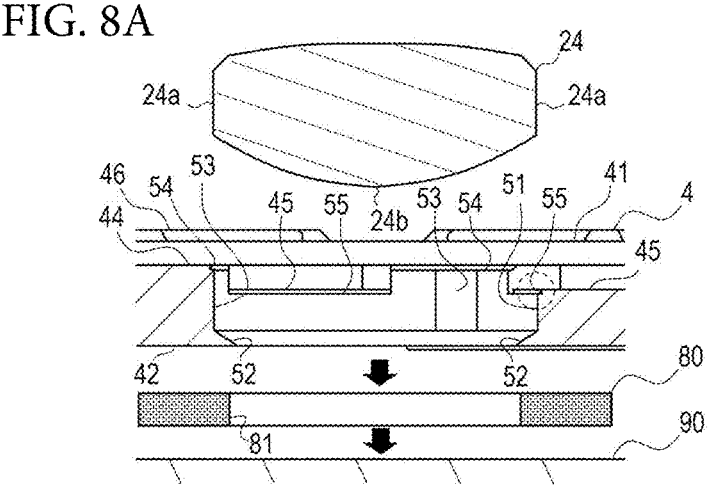
FIG. 8A to FIG. 8D sectional process drawings of a press-fitting process of the fourth lens into the lens holder according to the first embodiment.

A glass receiving surface 90 and a spacer 80 are used as jigs, as illustrated in FIG. 8A. For the glass receiving surface 90, a plate made of material harder than the fourth lens 24, such as ceramics or sapphire glass, for example, is finished to a mirror surface. Because the plate is mirror-finished, the image-side lens surface 24b will not be scratched at the time of press-fitting.

The spacer 80 is a plate of made of stainless steel of a predetermined thickness, for example. The thickness is determined by how much the image-side lens surface 24b protrudes from the cylinder part 50 when the fourth lens 24 is press-fitted into the lens holder 4. In other words, the protruding amount of the image-side lens surface 24b can be changed, and thus the optical characteristics can be adjusted, by using spacers 80 of different thicknesses.

The spacer 80 has a spacer opening 81 of substantially the same size as the opening of the image-side flat surface 42 of the cylinder part 50, more specifically, smaller than the inner diameter of the cylinder part 50 and larger than the diameter of the annular projection part 52.

Figure 8B:
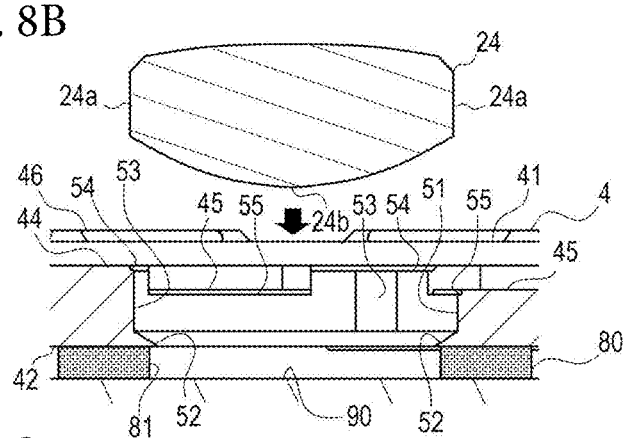

As the jig arranging process, the spacer 80 is arranged on the glass receiving surface 90, as illustrated in FIG. 8B. Further, as the lens holder arranging process, the lens holder 4 is arranged on the spacer 80. At this time, the opening on the image side L2 of the cylinder part 50, i.e., the annular projection part 52, is to the inside of the spacer opening 81. In this state, the fourth lens 24 is press-fitted into the cylinder part 50 of the lens holder 4.

Figure 8C:
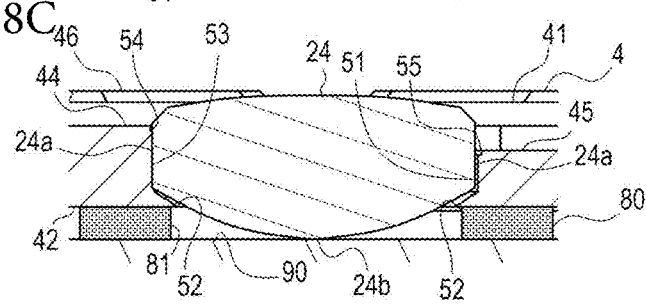

Next, the fourth lens 24 is press-fitted until the image-side lens surface 24b abuts against the glass receiving surface 90, as illustrated in the glass lens press-fitting process in FIG. 8C. At this time, the image-side lens surface 24b does not touch the annular projection part 52. That is, the image-side lens surface 24b of the fourth lens 24 is press-fitted and fixed in the cylinder part 50 with the gap S between the image-side lens surface 24b and the annular projection part 52. Therefore, variation in the position of the fourth lens 24 due to manufacturing variation (dimensional tolerance) of the annular projection part 52 will not occur. That is, the center axis of the fourth lens 24 and the center axis of the lens holder 4 are able to be made to match the optical axis L with high accuracy.

Also, because the fourth lens 24 is not positioned by the annular projection part 52, accuracy of the annular projection part 52 is not required, so design and manufacturing are easier. In particular, if the image-side lens surface 24b is an inclined or curved surface, the annular projection part 52 also needs to be shaped accordingly, which makes it difficult to control manufacturing, but such work is able to be suppressed. From another point of view, there is no need to set the shape of the annular projection part 52 to a shape that matches the image-side lens surface 24b, so the degree of freedom of design improves.

Figure 8D:
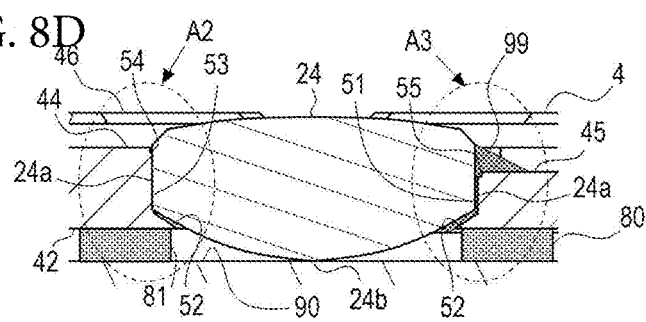

After the fourth lens 24 is press-fitted, the adhesive 99 is injected into the adhesive groove 45, and infrared light is irradiated at a timing when the adhesive 99 has flowed into the gap between the lens side surface 24a and the cylinder part side surface 51 to cure the adhesive 99, as illustrated in the adhering step in FIG. 8D.

According to the present embodiment described above, because the gap is formed between the fourth lens 24 and the holder inclined surface (the annular projection part 52) that has conventionally been used as the receiving surface for the glass lens, the adhesive 99 is able to spread from the lens side surface 24a to the lens surface side (the image-side lens surface 24b). Therefore, the adhesive strength is able to be increased. Also, the adhesive 99 will not easily overflow from this gap on the lens surface side (the image-side lens surface 24b) because of capillary action. As a result, the degree of freedom with regard to the shape of the annular projection part 52 increases, so more effective designs become possible, thus making it possible to prevent the spread of the adhesive 99 into the lens effective range of the fourth lens 24.

Also, positioning in the lens height direction can also be accurately determined regardless of the parts accuracy of the fourth lens 24, which is a glass lens, and the lens holder 4.

By appropriately selecting spacers 80 of different thicknesses, it is possible to change the relative position of the lens holder and the glass lens. That is, the position of the glass lens inside the lens unit can be adjusted, so the characteristics, e.g., the resolution and angle of view, of the lens unit, can be finely adjusted.

The characteristics of the present embodiment are summarized as follows.

The fourth lens 24 that is a glass lens is press-fitted and fixed in the cylinder part 50 with the gap S between the fourth lens 24 and the annular projection part 52, so the position of the fourth lens 24 in the optical axis L direction can be accurately obtained regardless of the part accuracy of the lens holder 4, the part tolerance of the fourth lens 24 and the lens holder 4, and deformation of the lens holder 4 at the time of assembly and the like.

Also, because the fourth lens 24 is press-fitted and fixed in the cylinder part 50, shavings may be produced by a portion of the cylinder part 50 being scraped off at the time of press-fitting. There is a concern that these shavings may end up leading to a decrease in the positional accuracy of the fourth lens 24 in the optical axis L direction. However, the shavings are able to collect in the gap between the fourth lens 24 and the annular projection part 52, so this concern can be eliminated.

Also, as described above, the fourth lens 24 is press-fitted and fixed in the cylinder part 50 with a gap between the fourth lens 24 and the annular projection part 52. In order to avoid deformation and the like that accompanies press-fitting, the press-fitting force may be set small, and in such a case, the fixation can be reinforced by fixing the gap with the adhesive 99.

Also, the burrs 59a and 59c may be produced at the installation opening when the lens holder 4 is removed from the mold 70 at the time of resin molding. These burrs may be dragged in during press-fitting, so providing the stepped parts 54 and 55 makes it possible to keep the burrs 59a and 59c away from the press-fit portion of the lens (the contact portion between the press-fitting part 53 and the lens side surface 24a), and thus makes it possible to inhibit the burrs 59a and 59c from getting dragged in.

Also, by setting the gap S between the annular projection part 52 and the image-side lens surface 24b of the fourth lens 24 narrow, capillary action makes it possible to prevent the adhesive 99 from spreading to the effective surface of the image-side lens surface 24b when the adhesive 99 is injected.

Also, by forming the press-fitting part 53 in a plurality of, more specifically three, locations at equidistant intervals so as to extend in the direction of the optical axis L (i.e., inward), on the inner peripheral surface of the cylinder part 50, the load in press-fitting is able to be balanced.

Further, if the press-fitting part 53 is formed on the portion corresponding to the D-cut part 49, the D-cut part 49 may deform due to the load at the time of press-fitting, so the degree of freedom in design ends up decreasing. This can be avoided.

Also, because the press-fitting parts 53 and the image-side positioning parts 48 are formed in the same radial direction, the image-side positioning parts 48 are provided in the direction in which force is applied when press-fitting the fourth lens 24, i.e., on the image side, which is advantageous from the viewpoint of strength.

Further, a predetermined amount of the adhesive 99 is injected into the adhesive groove 45 from a supply needle. The injected adhesive 99 reliably flows from the installation opening into the gap between the fourth lens 24 and the cylinder part 50, and will not spread in an unexpected direction.

Also, in the installation process for installing the fourth lens 24 into the lens holder 4, the press-fitting amount of the fourth lens 24, which is a glass lens, can be adjusted with spacers 80 of different thicknesses. That is, the optical characteristics can be adjusted. Also, the fourth lens 24 will not be scratched because the jig surface, which is mirror-finished, is made the glass receiving surface 90. Moreover, because the material is harder than the fourth lens 24 which is a glass lens, the jig surface can be prevented from deforming, so variation in the press-fitting amount can be prevented.

Second Embodiment

The present embodiment illustrates a modified example of the shape of the lens holder 4 of the first embodiment. FIG. 9A to FIG. 9C are views illustrating a lens holder 104 of the present embodiment, and the fourth lens 24 that has been press-fitted into this lens holder 104, and shows a state before fixation is reinforced with adhesive. FIG. 9A is a plan view, FIG. 9B is a side view, and FIG. 9C is a sectional view taken along line X3-X3 in FIG. 9A. Here, mainly the configuration that differs from the lens holder 4 of the first embodiment will be described.

An object-side flat surface 141 includes an outer edge-side flat surface 143 and an inner edge-side flat surface 144, and a cylinder part 150 is formed in the center, similar to the lens holder 4 of the first embodiment. An adhesive groove 145 of the inner edge-side flat surface 144 and a press-fitting part 153 of a cylinder part side surface 151 are each formed in three locations in the same positions as in the first embodiment.

On the other hand, an object-side positioning part 146 that is formed on the outer edge-side flat surface 143 is changed from six locations to three locations, and has a cylindrical shape. The positions of the object-side positioning parts 146 are the same as the angular direction of the press-fitting parts 153.

An annular projection part 152 that is formed on the end part on the image side L2 of the cylinder part 150 protrudes horizontally toward the center in the radial center of the cylinder part 150. That is, in the first embodiment, the surface of the annular projection part 52 that faces the fourth lens 24 is formed inclined so as to be parallel to the surface of the fourth lens 24. However, in the present embodiment, the surface of the annular projection part 52 does not match the image-side lens surface 24b of the fourth lens 24, and instead protrudes toward the center in the radial direction.

As described above, the annular projection part 152 is separated from the image-side lens surface 24b, and thus does not serve as a reference surface for positioning. Therefore, the shape of the annular projection part 152 can be formed as described in the present embodiment. Note that the end part on the image side L2 of the annular projection part 152 has a tapered shape.

Also, a stepped part is not formed at the boundary portion of the inner edge-side flat surface 144 and the cylinder part 150 and the boundary portion of the adhesive groove 145 and the cylinder part 150. That is, the position where the burr 59 in the first embodiment occurs is not particularly controlled. Even if a burr were to occur at the boundary portion of the inner edge-side flat surface 144 and the cylinder part 150, and the burr were to be dragged in during press-fitting of the fourth lens 24, the burr could be accommodated in the space between the annular projection part 152 and the image-side lens surface 24b, and moreover, such a burr could be fixed by adhesive. Therefore, tilt error and distortion when press-fitting the fourth lens 24 can be suppressed, and further, inconveniences such as the press-fitting process being adversely affected by burrs falling toward the jig side (the glass receiving surface 90 in the first embodiment) from the cylinder part 150 can be suppressed.

Although at least an embodiment of the present invention has been described based on the embodiments, these embodiments are merely examples. It is understood by a person skilled in the art that various modified examples are possible with the combinations of each of the constituent elements, and that these modified examples are also within the scope of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit comprising:
   a plurality of lenses, and
   a mirror cylinder that holds the plurality of lenses,
   wherein at least one of the plurality of lenses comprises a glass lens held in a lens holder having a cylinder part;
   the lens holder comprises an annular projection part that protrudes radially inward from the cylinder part, on the opposite side of the cylinder part from an installation opening for the glass lens;
   the glass lens is press-fitted and fixed in the cylinder part with a gap between the glass lens and the annular projection part, the glass lens being fixed with an adhesive;
   the adhesive groove, which is a groove that is connected to the installation opening and into which the adhesive is injected and accumulates, is provided on an installation opening-side flat surface of the lens holder; and
   the glass lens is fixed inside the cylinder part by the adhesive that has flowed into a gap between the lens side surface of the glass lens and the cylinder part side surface of the cylinder part and cured, and the adhesive that has flowed into the gap between the glass lens and the annular projection part and cured.

2. The lens unit according to claim 1, wherein a stepped part for burr clearance is formed at the installation opening.

3. The lens unit according to claim 1, wherein the annular projection part has a shape that follows an opposing portion of a lens surface on the opposite side of the glass lens from the installation opening.

4. The lens unit according to claim 1, wherein the cylinder part comprises a bulging part that bulges out radially inward and is used to press-fit and fix the glass lens.

5. The lens unit according to claim 4, wherein
   the lens holder comprises a D-cut part; and
   the bulging part is formed avoiding a region corresponding to the D-cut part.

6. The lens unit according to claim 4, wherein
   a projection part that serves as a position reference surface when arranged on an adjacent lens is provided on an image-side surface of the lens holder; and
   the bulging part is formed in the same radial direction as the position where the projection part is formed.

7. The lens unit according to claim 1, characterized in that:
   the glass lens comprises an inclined surface formed on the installation opening side of the glass lens;
   the adhesive is injected onto the installation opening-side flat surface of the lens holder; and
   the glass lens is fixed inside the cylinder part by the adhesive that has flowed into the gap between the inclined surface and the cylinder part side surface and cured.

8. A method for manufacturing a lens unit a plurality of lenses, and a mirror cylinder that holds the plurality of lenses, wherein at least one of the plurality of lenses comprises a glass lens held in a lens holder having a cylinder part; the lens holder comprises an annular projection part that protrudes radially inward from the cylinder part, on the opposite side of the cylinder part from an installation opening for the glass lens; and the glass lens is press-fitted and fixed in the cylinder part with a gap between the glass lens and the annular projection part; the method comprising:
   a jig arranging process comprising arranging a spacer having an opening, on a jig surface that is made of material harder than the glass lens and that has been mirror finished;
   a lens holder arranging process comprising arranging the lens holder on the spacer such that the image-side opening of the cylinder part is aligned with the opening of the spacer; and
   a lens press-fitting process comprising press-fitting the glass lens until the image-side lens surface abuts against the jig surface.

* * * * *